US008855099B2

(12) United States Patent
Kitazoe et al.

(10) Patent No.: US 8,855,099 B2
(45) Date of Patent: Oct. 7, 2014

(54) SELECTIVE PHASE CONNECTION ESTABLISHMENT

(75) Inventors: Masato Kitazoe, Tokyo (JP); Francesco Grilli, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 828 days.

(21) Appl. No.: 12/043,739

(22) Filed: Mar. 6, 2008

(65) Prior Publication Data

US 2008/0310378 A1 Dec. 18, 2008

Related U.S. Application Data

(60) Provisional application No. 60/895,579, filed on Mar. 19, 2007.

(51) Int. Cl.
*H04J 3/06* (2006.01)

(52) U.S. Cl.
USPC ...... 370/350; 370/395.21; 370/401; 370/437; 370/438; 370/462

(58) Field of Classification Search
USPC .................. 370/328, 329, 330, 331; 455/434, 455/435.1, 436, 437, 438, 439, 450, 509
See application file for complete search history.

(56) References Cited

U.S. PATENT DOCUMENTS

| 2002/0066011 A1* | 5/2002 | Vialen et al. ............... 713/150 |
| 2003/0119452 A1 | 6/2003 | Kim et al. |
| 2004/0008659 A1 | 1/2004 | Kim |
| 2004/0148352 A1 | 7/2004 | Menon et al. |
| 2005/0083893 A1* | 4/2005 | Purkayastha et al. ......... 370/338 |
| 2005/0153706 A1 | 7/2005 | Niemenmaa et al. |
| 2005/0249120 A1 | 11/2005 | Heo et al. |
| 2005/0255872 A1* | 11/2005 | Lundell et al. ................ 455/522 |
| 2006/0291403 A1 | 12/2006 | Kahtava et al. |
| 2007/0117563 A1* | 5/2007 | Terry et al. ..................... 455/434 |
| 2007/0123195 A1* | 5/2007 | Lv et al. ......................... 455/403 |
| 2008/0002733 A1* | 1/2008 | Sutskover ..................... 370/436 |
| 2010/0197315 A1* | 8/2010 | Lindstrom et al. ............ 455/450 |

FOREIGN PATENT DOCUMENTS

| CN | 1788515 A | 6/2006 |
| JP | 2004241897 A | 8/2004 |
| JP | 2005005967 A | 1/2005 |
| RU | 2236757 | 9/2004 |

(Continued)

OTHER PUBLICATIONS

3rd Generation Partnership Project; Technical Specification Group Radio Access Network; Evolved Universal Terrestrial Radio Access (E-UTRA) Radio Resource Control (RRC); Protocol specification (Release 8),3GPP TS 36.331 V8.0.0 Dec. 2007, pp. 1-56.
Panasonic, RRC Connection setup behaviour, 3GPP TSG RAN WG2#58bis, R2-072654, Orlando, USA Jun. 25, 2007.
Taiwan Search Report—TW097109752—TIPO—Jan. 8, 2013.

(Continued)

*Primary Examiner* — Alvin Zhu
(74) *Attorney, Agent, or Firm* — John J. Ketchum

(57) ABSTRACT

Systems and methodologies are described that facilitate multiple-phase selective connection establishment in wireless communications networks. Radio resource control (RRC) layer communications can be instantiated between a mobile device and base station. Additional information can be required by a downstream network component regarding the mobile device. Accordingly, the RRC resources can be utilized to transmit the additional information from the mobile device to the network component to facilitate the multiple-phase establishment. This can be accomplished using non-access stratum (NAS) messages. Further, the information can relate to authorization, security re-configuration, context re-synchronization, an identity of the mobile device, and the like.

50 Claims, 11 Drawing Sheets

(56) References Cited

FOREIGN PATENT DOCUMENTS

| TW | I239743 B | 9/2005 |
|---|---|---|
| TW | I262010 B | 9/2006 |
| WO | 2004043024 A1 | 5/2004 |
| WO | 2004100598 | 11/2004 |
| WO | WO2004102837 A1 | 11/2004 |
| WO | WO2006019243 A1 | 2/2006 |

OTHER PUBLICATIONS

Taiwan Search Report—TW097109752—TIPO—Nov. 3, 2013.
3GPP TR 25.912 V7.1.0 (Sep. 2006), 3rd Generation Partnership Project; Technical Specification Group Radio Access Network; Feasibility study for evolved Universal Terrestrial Radio Access (UTRA) and Universal Terrestrial Radio Access Network (UTRAN) (Release 7), 57 pages.

* cited by examiner

SELECTIVE PHASE CONNECTION ESTABLISHMENT

CROSS-REFERENCE TO RELATED APPLICATIONS

This application claims the benefit of U.S. Provisional Patent application Ser. No. 60/895,579 entitled "METHOD AND APPARATUS FOR ESTABLISHING A CONNECTION IN A WIRELESS COMMUNICATION SYSTEM" which was filed Mar. 19, 2007. The entirety of the aforementioned application is herein incorporated by reference.

BACKGROUND

I. Field

The following description relates generally to wireless communications, and more particularly to establishing connections for communicating in wireless networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennae can relate to both base stations and mobile devices, in one example, allowing bi-directional communication between the devices on the wireless network. Mobile devices can operate in active, idle, and/or other states depending on location, resource requirements, power status, moving in range of a base station, etc. The mobile device can switch between states, which can require establishing a connection, re-authorization with core network components, and the like. Messages for establishing connection are typically allocated a single frame in third generation partnership project (3GPP) networks, 3GPP long term evolution (LTE) networks, and the like, which allows for a single-phase connection procedure.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating providing a selectable multiple-step connection establishment with one or more access points. For example, a single-step connection establishment procedure can be utilized; additionally, where the single-step procedure is insufficient to transmit required or desired authorization data, the multiple-step procedure can be chosen. In one example, the connection establishment procedure can require a non-access stratum (NAS) message that can require more than the single transmission time interval (TTI) allocated to the connection procedure. In this regard, the multiple-step procedure can be utilized to transmit the additional data in a subsequent request.

According to related aspects, a method for establishing connection with an access point in a wireless communications network is provided. The method can include transmitting initial parameters related to establishing a connection at a radio resource control (RRC) layer. The method can also include generating additional parameters for establishing a user plane data connection based at least in part on a request for the additional parameters and transmitting the additional parameters over the RRC layer to establish the user plane data connection.

Another aspect relates to a wireless communications apparatus. The wireless communications apparatus can include at least one processor configured to transmit initial parameters related to establishing a connection at a radio resource control (RRC) layer, generate additional parameters for establishing a user plane data connection based at least in part on a request for the additional parameters, and transmit the additional parameters over the RRC layer to establish the user plane data connection. The wireless communications apparatus can also include a memory coupled to the at least one processor.

Yet another aspect relates to a wireless communications apparatus that uses a selective multiple-phase connection establishment in a wireless communications network. The wireless communications apparatus can include means for transmitting initial parameters related to establishing a connection at a radio resource control (RRC) layer. The wireless communications apparatus can additionally include means for generating additional parameters for establishing a user plane data connection based at least in part on a request for the additional parameters and means for transmitting the additional parameters over the RRC layer to establish the user plane data connection.

Still another aspect relates to a computer program product, which can have a computer-readable medium including code for causing at least one computer to transmit initial parameters related to establishing a connection at a radio resource control (RRC) layer. The computer-readable medium can further comprise code for causing the at least one computer to generate additional parameters for establishing a user plane data connection based at least in part on a request for the additional parameters. Moreover, the computer-readable medium can include code for causing the at least one computer to transmit the additional parameters over the RRC layer to establish the user plane data connection.

According to a further aspect, a method for facilitating user plane connection for mobile devices in a wireless communications network is provided. The method can comprise transmitting initial parameters to a network device as part of requesting a user plane connection for a mobile device from the network device. Moreover, the method can include receiving a request for additional mobile device parameters from the network device and transmitting the request for additional mobile device parameters to the mobile device.

Another aspect relates to a wireless communications apparatus. The wireless communications apparatus can include at least one processor configured to transmit initial parameters to a network device as part of requesting a user plane connection for a mobile device from the network device, receive a request for additional mobile device parameters from the network device, and transmit the request for additional mobile device parameters to the mobile device. The wireless communications apparatus can also include a memory coupled to the at least one processor.

Yet another aspect relates to a wireless communications apparatus for establishing a multiple-phase user plane connection for a mobile device. The wireless communications apparatus can comprise means for transmitting initial parameters to a network device as part of requesting a user plane connection for a mobile device from the network device and means for receiving a request for additional mobile device parameters from the network device. The wireless communications apparatus can further include means for transmitting the request for additional mobile device parameters to the mobile device.

Still another aspect relates to a computer program product, which can have a computer-readable medium including code for causing at least one computer to transmit initial parameters to a network device as part of requesting a user plane connection for a mobile device from the network device. The computer-readable medium can also include code for causing the at least one computer to receive a request for additional mobile device parameters from the network device. Furthermore, the computer-readable medium can comprise code for causing the at least one computer to transmit the request for additional mobile device parameters to the mobile device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
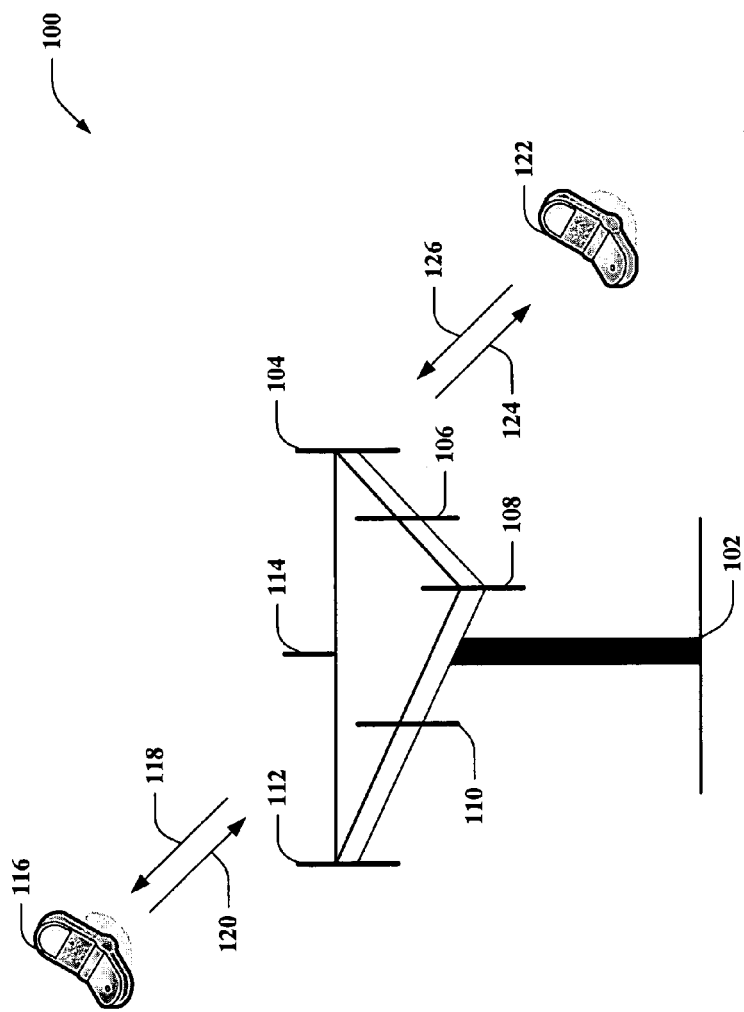
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. The communication channels can comprise one or more logical channels in one example. The mobile devices 116 and 122 can switch from an idle to an active state (e.g., by moving in range of base station 102, desiring resources therefrom, and/or the like) connecting to the base station 102 to request the communications channels and/or additional resources using a connection request. This can be performed in a radio resource control (RRC) layer of the mobile devices 116 and 122 that handles establishment, reconfiguration, and release of radio bearers in a signaling plane. When connection is established, signal data transfer can occur. In another example, the single-phase connection can be sufficient to begin user plane data transfer as well.

However, in some cases, it can be desirable to send additional information with a connection request, such as a non-access stratum (NAS) message, re-authorization information, and/or additional parameters. Likewise, a single transmission time interval (TTI) allocated for the signaling connection setup described above may not allow enough time to transmit the desired parameters. Thus, a multiple-step connection procedure can be chosen where the initial connection request message can be sent from the mobile device 116 and/or 122 to the base station 102, and subsequently, an additional message can be sent to the base station 102 from the mobile device 116 and/or 122 comprising the additional information. After the information is transmitted, the base station 102 can transmit the connection setup confirmation to the mobile device 116 and/or 122 allowing subsequent user plane data transfer.

In one example, the base station 102 can transmit connection requests to one or more disparate network components (not shown) based on the request from the mobile device 116 and/or 122. For example, the request can be transmitted to a mobility manage entity (MME), or a like component, that manages and stores UE context, which can include identities, mobility data, other security parameters, and/or the like. The MME, in one example, can transmit a verification back to the base station 102 and/or an early downlink message to transmit to the mobile device 116 and/or 122 allowing the mobile device 116 and/or 122 and/or the base station 102 to transmit additional data (such as re-authorization parameters, and/or other parameters that can be in a NAS message). Subsequently, the mobile device 116 and/or 122 and/or the base station 102 can transmit the additional information and receive a connection setup message allowing subsequent user data transfer.

Figure 2:
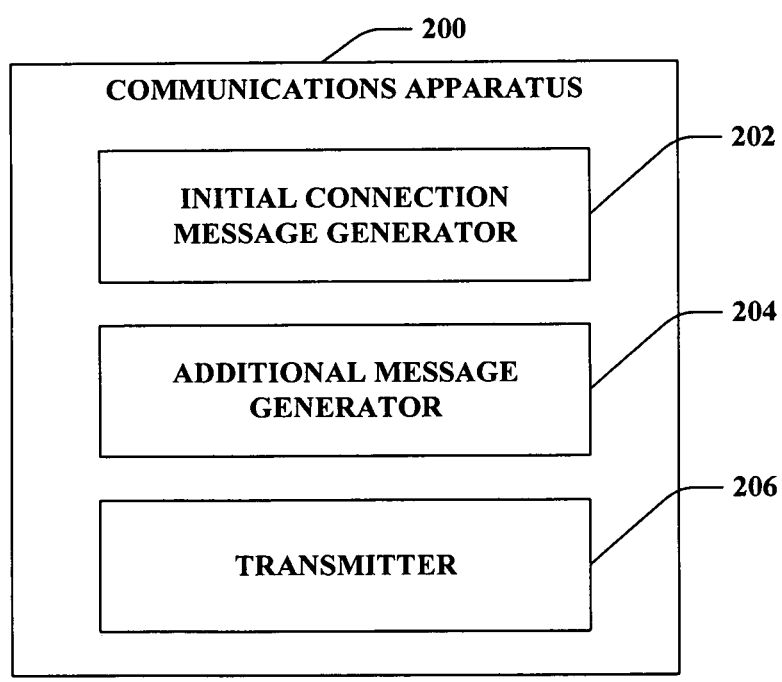
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that transmits and/or receives data transmitted in a wireless communications environment. The communications apparatus 200 can include an initial connection message generator 202 that can create an initial connection message, such as an RRC message, an additional message generator 204 that can create additional parameters or messages to send in a connection establishment, such as a NAS message, re-authentication message, and/or the like, and a transmitter 206 that can broadcast the disparate messages to one or more access points.

In one example, the communications apparatus 200 can be attempting to connect with one or more access points for transmitting communication data. The communications apparatus 200 can utilize the transmitter 206 to transmit a preamble communication to one or more access points. This can result in receiving an initial uplink access grant with the access point. The initial connection message generator 202 can then be utilized to create a connection establishment request, such as an RRC message, to acquire radio resources at an RRC layer, for example. The initial connection message can be transmitted to the access point using the transmitter 206. In some cases, however, the size of an initial message can be limited in a wireless communication configuration, such as an RRC message that can be limited to a single TTI. Thus, additional information can be desired and/or required.

If this is the case, the communications apparatus 200 can utilize a multiple-step connection establishment by using the additional message generator 204 to create a message comprising additional parameters or other data to transmit to the access point or another component in communication therewith. It is to be appreciated that in one example the additional message creation (or transmission by transmitter 206) can occur based on receiving an early downlink message from the access point to indicate that, for example, the initial connection message was received, transmitted to a network component (not shown), received a response from the network component, etc. The downlink message can also comprise resources for transmitting the additional message, for instance. The additional message can comprise, in one example, a NAS message, which allows communication between the communications apparatus 200 and the network component and can be desired for sending by the communications apparatus 200 or required by a downstream network component, in one example. The NAS message can be a service request message, tracking area update request message, a message utilized to verify or transmit a communications apparatus 200 or user/UE context, identification, authorization information, and/or the like in one example.

Moreover, the additional message can be utilized to facilitate re-authorizing and/or re-configuration of security between the communications apparatus 200 and a network component; in one example, the access point can be utilized to facilitate communicating between the component and apparatus 200. For example, the network can require the re-authorization and/or reconfiguration of security for a number of reasons, including expiration of a session time, lost connection, change of state, handover to disparate base stations, etc. In this regard, the additional message generator 204 can be utilized to generate the required or requested security/re-authentication information, and the information can be transmitted to the network component (e.g., via an access point) by the transmitter 206. In another configuration, the additional message can be utilized to re-synchronize a UE or communications apparatus 200 context, for example, where the network needs a context that describes different information about the UE or communications apparatus 200 and/or a communication session associated therewith.

It is to be appreciated that the communications apparatus 200 can select a single- or multiple-phase connection establishment depending on a variety of factors, including but not limited to a received request for additional communication, an inference made regarding information required by one or more network components of the wireless communications network, and/or the like. For example, a message can be communicated from the network component (e.g., through the access point) to the communications apparatus 200 requesting one or more additional messages before communication can be established. This can occur, for example, following the initial connection message transmission. Whether the communications apparatus 200 selects single- or multiple-phase connection establishment, the result can be user plane data transfer following a connection setup status (e.g., from the network component).

Figure 3:
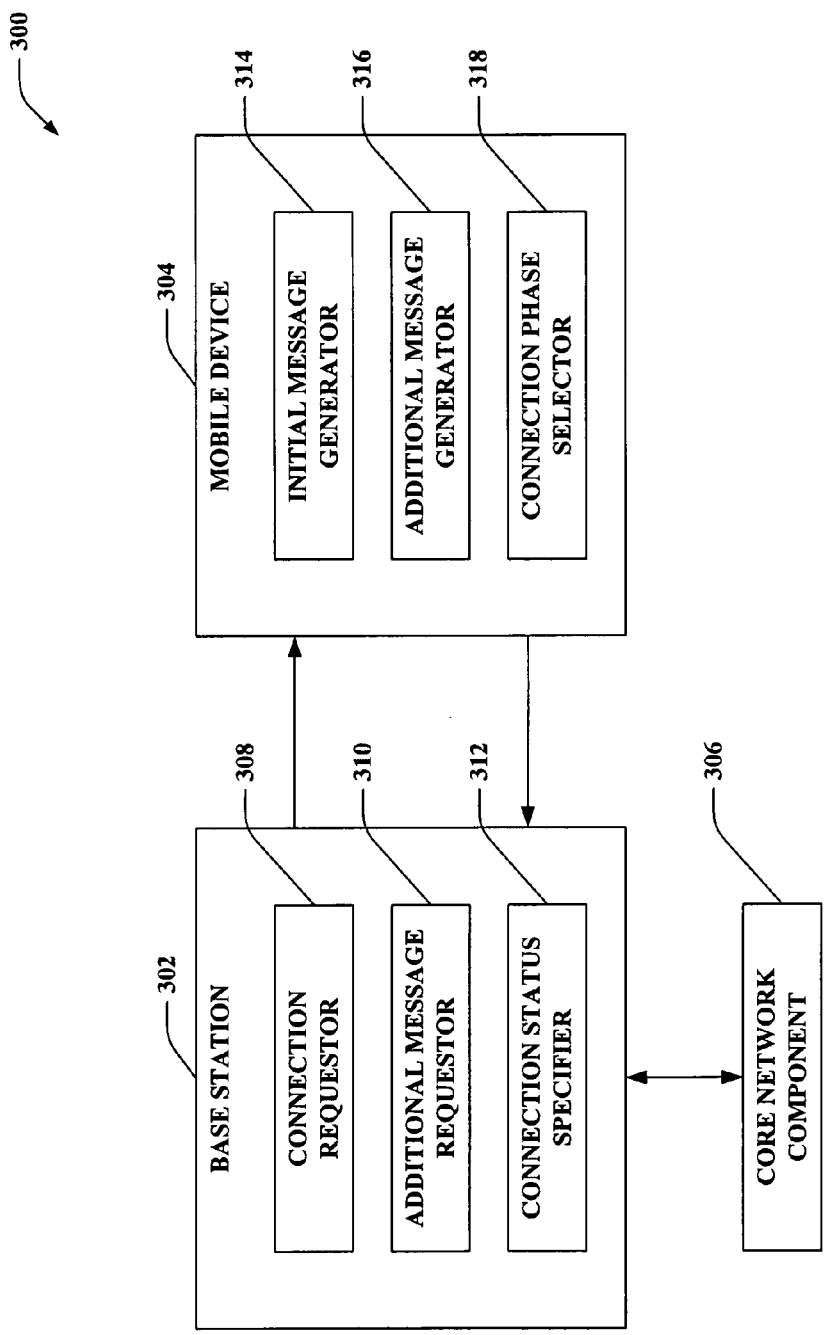
FIG. 3 is an illustration of an example wireless communications system that effectuates selective multiple-phase connection establishment.

Now referring to FIG. 3, illustrated is a wireless communications system 300 that can utilize a single- or multiple-step selectable communication connection establishment. The system 300 includes a base station 302 that can communicate with a mobile device 304 (and/or any number of disparate mobile devices (not shown)) to facilitate wireless communication service. Base station 302 can transmit information to mobile device 304 over a forward link channel; further base station 302 can receive information from mobile device 304 over a reverse link or uplink channel. In addition, the base station 302 can send data to and receive data from a core network component 306 to facilitate communicating with the mobile device 304 and providing service thereto. In one example, the core network component 306 can be an MME. Moreover, system 300 can be a MIMO system. Additionally, the system 300 can operate in an OFDMA wireless network (such as 3GPP, 3GPP LTE, and the like, for example). Also, the components and functionalities shown and described below in the base station 302 can be present in the mobile device 304 as well and vice versa, in one example; the configuration depicted excludes these components for ease of explanation.

Base station 302 includes a connection requestor 308 that can request connection establishment for a mobile device 304 using the core network component 306, an additional message requestor 310 that can request additional information or parameters from the mobile device 304 to further the connection establishment, and a connection status specifier 312 that can return a status of establishing the connection to the mobile device 304. In one example, the connection requestor 308 can request information from the core network component 306 regarding mobile device 304 in response to a connection establishment request therefrom. If additional information is required for establishing the connection, the additional message requestor 310 can request the information or prompt the mobile device 304 to send information, for example. The connection status specifier 312 can transmit a connection status to the mobile device 304, for example, when connection establishment is complete or when a timeout occurs, etc.

Mobile device 304 includes an initial message generator 314 that creates a connection establishment message, such as an RRC message, an additional message generator 316 that can send additional connection related parameters (such as security, context, identity parameters, and the like), and a connection phase selector 318 that can choose a single- or multiple-phase connection establishment based at least in part on a need to transmit additional information with the connection establishment request. For example, upon requesting communication establishment with the base station 302 (e.g., as a result of state change, such as from idle to active), the initial message generator 314 can create a connection establishment message, such as an RRC message, that can be size limited (e.g., to one or more TTIs) and send the message to the base station 302. If additional information is desired or required, the connection phase selector 318 can opt for a multiple-phase connection establishment, and the additional message generator 316 can create a message with the additional parameters transmitting the additional message to the base station. It is to be appreciated that this can be performed based on a request from the base station 302 for additional data in one example.

According to an example, the mobile device 304 can utilize the initial message generator 314 to create and send an initial connection message to the base station 302. In this regard, the mobile device 304 can attempt to establish a connection with the base station 302. The base station 302 can utilize the connection requestor 308 to initialize, authenticate the mobile device 304 with the core network component 306, and/or provide media-level (e.g., RRC layer) communication resources. It is to be appreciated that base station 302 can transmit information regarding the mobile device 304 with the core network component 306 communication. For example, the base station 302 can transmit an identity, context, security parameters, and/or the like regarding the mobile device 304 to the core network component 306. If the information transmitted is sufficient for the base station 302 and/or the core network component 306 and/or if the connection phase selector has chosen a single-phase connection establishment, the connection status specifier 308 can return a status of the connection to the mobile device 304. This can be based at least in part on information received from the core network component 306 in one example.

According to an example, the core network component 306 can desire additional information from the mobile device 304 before granting connection establishment, or the mobile device 304 can desire to transmit additional information, such as a service request or service request message, tracking area update request message, etc. This can be the result of lack of allowed transmission size for the initial connection message. Thus, the core network component 306 can transmit the request back to the base station, which can utilize the additional message requester 310 to notify the mobile device 304 of the additional information request. The request can be explicit or can simply be an indicator, Boolean variable, and/or the like. In the case where the mobile device 304 desires to send additional information, it can piggyback the additional information on the connection setup request (such as in a NAS message). Moreover, the base station 302 can transmit a downlink message comprising scheduling resources for the mobile device 304 to transmit additional information. For example, the connection phase selector 318 can specify a multiple-phase connection establishment based at least in part on one or more of the above. Once the multiple-phase is selected, the additional message generator 316 can create a message comprising the additional information for transmission to the base station 302.

In one example, the additional information can be in the form of a NAS message that can be transmitted to the core network component 306 through the base station 302. The message can relate to re-authenticating or re-configuring security for the mobile device 304, for example, a mobile device 304 context re-synchronization, as explained above, and/or the like. In one example, the core network component 306 can re-authenticate the mobile device 304 where the mobile device 304 moves from an idle to an active state; such re-authentication can be required, for example, before user plane data transfer if a security context has expired, needs refreshing, etc., and can be requested through the additional message requestor 310 as described. In another example, the core network component 306 can be missing a context for the mobile device 304 and can request the context from the base station 302. In this example, the base station 302 can utilize the additional message requestor 310 to transmit the request for the context to the mobile device 304, and the context can be transmitted as the additional message as described previously.

In view of the above examples, the single-phase connection establishment can provide for establishing communication connection and resources between the base station 302 and mobile device 304 where initial information is all that is desired and/or required. However, the connection phase selector 318 can choose a multiple-phase connection establishment where additional information is desired from the base station 302, mobile device 304, and/or core network component 306. In either case, the single-phase can be utilized to initialize radio bearers for signaling between the mobile device 304 and the base station 302. In the multiple-phase connection establishment, the additional information can be utilized to initialize user plane radio bearers. Once established, user plane data transfer can occur.

Figure 4:
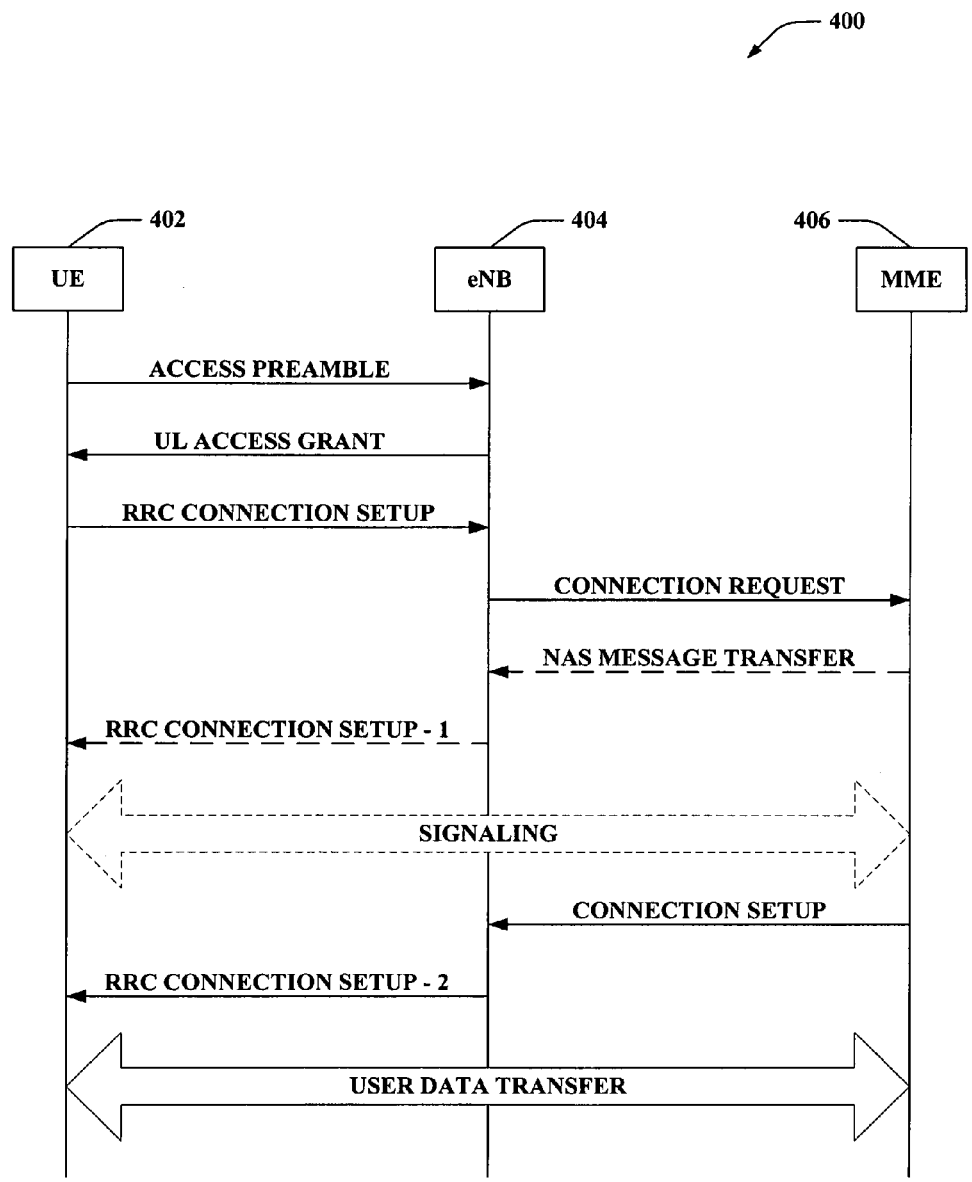
FIG. 4 is an illustration of an example wireless communications network with various communicating components.

Now referring to FIG. 4, an example wireless communications network 400 for connection establishment shown. A UE 402 is shown attempting to connect to an eNB 404. The eNB 404 leverages a core network MME 406 to gather and utilize information and/or to authenticate the UE or a user thereof, for example. As described above, the MME 406 can be utilized to authenticate a UE/user and can keep a context to allow for quick connection establishment. In this example, the UE 402 can transmit an access preamble to the eNB 406. This can be a request to obtain some uplink resource(s) to facilitate transmitting additional data for connection establishment. The eNB 404 can transmit an uplink access grant to the UE 402 as shown if the eNB has sufficient resources available, for example. The UE 402 can generate an initial connection message, such as an RRC connection setup message as shown, and transmit the message to the eNB 404 using the granted resources. Upon receiving the message, the eNB 404 can transmit a connection request to the MME 406 regarding the UE 402. It is to be appreciated that the eNB 404 can include substantially any information regarding the UE 402 in the request to the MME 406.

The MME 406 can analyze the UE 402 information in one example (e.g., to verify a security context, etc.) and optionally transmit a NAS message to be sent to the UE 402 via the eNB 404, which can indicate that additional information is required for establishing a connection (such as additional security context information, authentication initialization, etc.). In addition, the NAS message can optionally be piggybacked onto an RRC connection setup-1 message, which can be used to notify the UE 402 of the additionally requested parameters. In addition, the RRC connection setup-1 message can provide scheduled media access control (MAC) resources for radio signaling. It is to be appreciated that these messages are not required; however, utilizing this configuration can allow the eNB 404 to know that the additional signaling or parameters are requested and can send the information to the UE 402 without establishing further resources for the UE 402.

Following initial radio signaling resource establishment, if additional information or signaling is desired, the UE 402 can use signaling radio bearers to transmit information to the MME 406 via the eNB 404; for example, this can be accomplished using NAS messages. In one example, the UE 402 can transmit buffer status for the signaling radio bearers so the eNB 404 does not allocate unnecessary resources to the UE 402. The additional information transmitted can be one or more of additional security or authentication parameters, re-authorization parameters, parameters related to UE 402 context such as identity, and/or the like. In another example, the signaling can be re-authorization commands sent using additional resources received from an early downlink message placing the UE 402 in a normal data scheduling mode. Following the second phase of the authentication procedure shown, where information sent utilizing the signaling radio bearers is as requested, the MME 406 can transmit a connection setup message to the eNB 404 for the UE 402. The eNB 404 can establish additional resources for the UE 402 and transmit the RRC connection setup-2 message to establish connection. Subsequently, user data transfer can occur between the UE 402 and the MME 406.

In another example, the UE 402 can receive an early downlink message following the initial RRC connection setup message to place the UE 402 in a normal data scheduling mode (not shown); the UE 402 can subsequently transmit information directly to the MME 406 using resources assigned in the downlink message from the eNB 404 in lieu of the signaling. This can be the case, for example, where the UE 402 desires to transmit information beyond what can be sent in the initial RRC connection setup message (due to size limitation, for instance) without necessarily request from the MME 406. In one example, this can include a NAS message, such as a service request message or tracking area update request message. The information can be sent before the user data transfer can occur, but may not require the additional NAS message, RRC connection setup-1 message, or the signaling shown as optional communications, and thus can transpire instead of these messages following the connection request. Alternatively, the additional information, or a portion thereof, can be piggybacked to the RRC connection setup message. In one example, the eNB 404 can detect that UE 402 has piggybacked the NAS message to the RRC connection setup message and can wait for the NAS message transfer from the MME 406 before transmitting the RRC connection setup-1 message. If there is no NAS message piggybacked to the RRC connection setup message, the eNB 404 can transmit the RRC connection setup-1 message to the UE 402 as soon as it establishes the resources. According to the above examples, a multiple-phase connection establishment procedure can be utilized.

Figure 5:
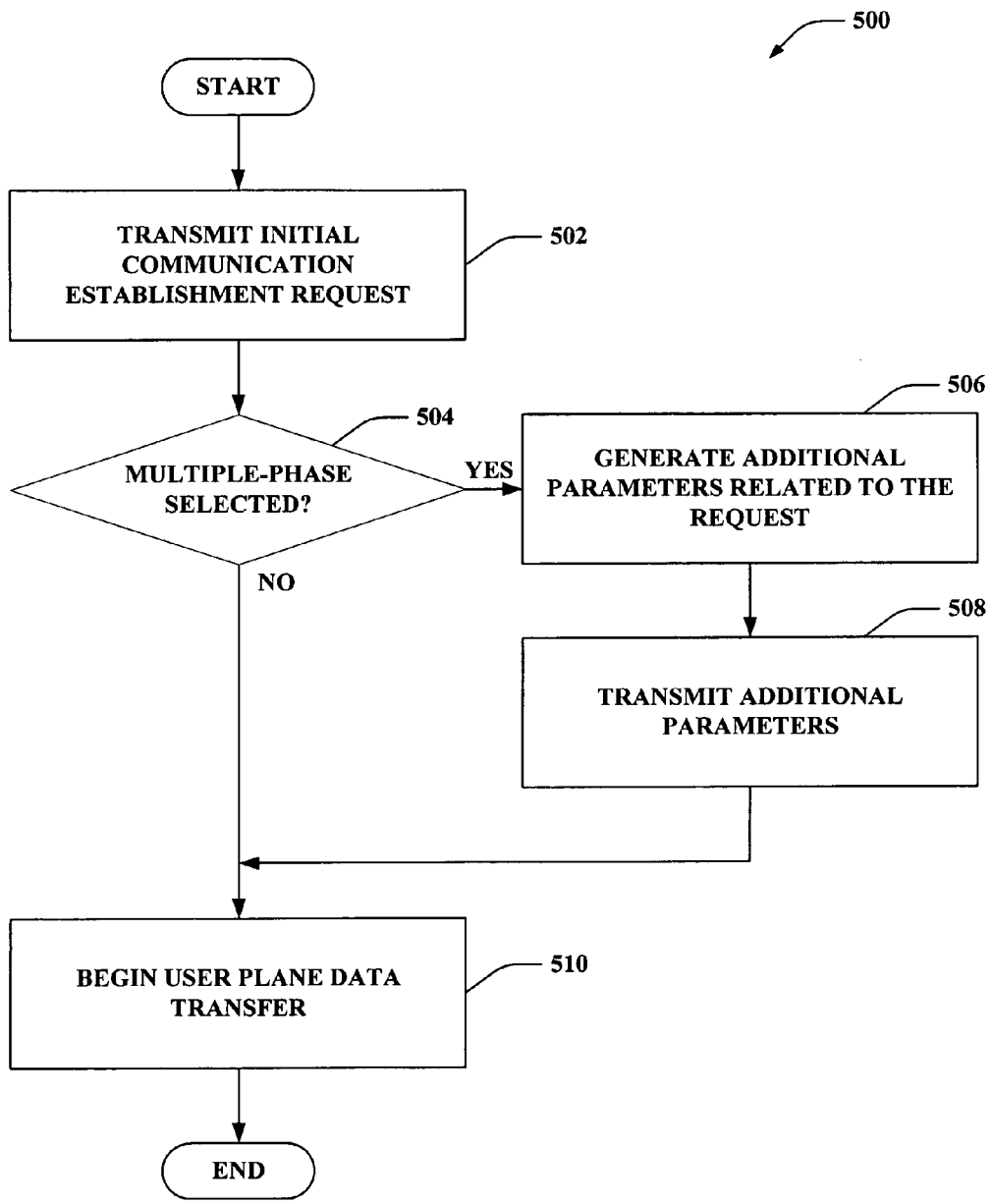
FIG. 5 is an illustration of an example methodology that facilitates selecting a single- or multiple-phase connection establishment.
Figure 6:
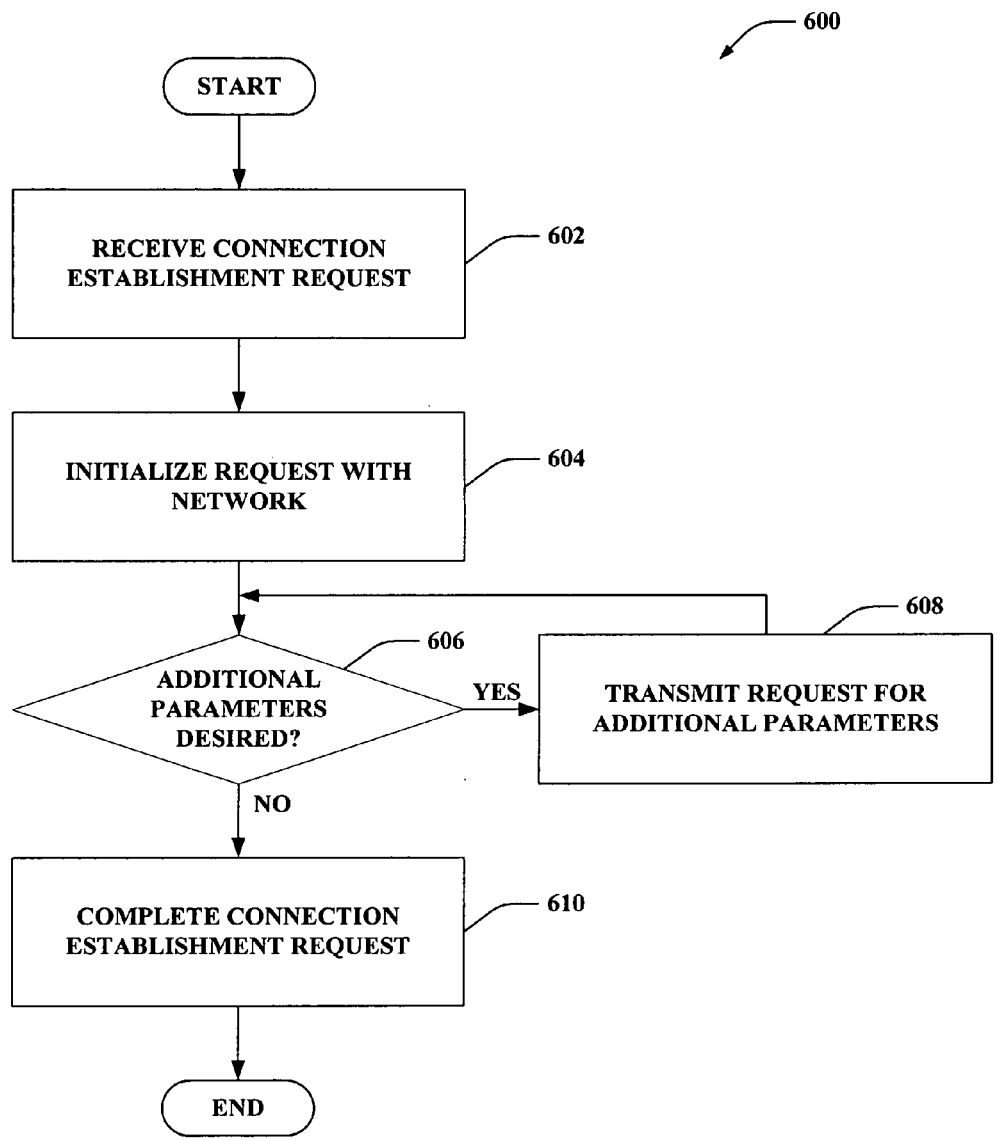
FIG. 6 is an illustration of an example methodology that facilitates allocating resources to establish a user plane connection.

Referring to FIGS. 5-6, methodologies relating to providing selective phase communication establishment in wireless communications networks are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates multiple-phase connection establishment in wireless communications networks. At 502, an initial communication establishment request can be transmitted. The request can comprise information regarding the requester and can be made at one or more network layers, such as an RRC layer, etc. In this regard, the initial communication can establish resources necessary to communicate additional data. At 504, a determination is made regarding whether multiple-phase connection establishment is selected. In one example, the initial communication establishment request can be sufficient to establish communications; however, in another example, more information can be required. For example, a multiple-phase selection can be made to accommodate a desire to transmit additional information where the initial communications establishment request is too small or where a downstream network component requires additional information as described previously.

Where multiple-phase connection establishment is selected (e.g., because additional information or parameters are desired/required), at 506, additional parameters are generated related to the request for communication establishment. For example as mentioned above, the parameters can relate to re-authorizing with respect to a network, re-synchronizing a context, re-configuring security parameters, providing an identity, and/or the like. In one example, the allowed initial communication establishment request size can be insufficient to transmit the additional parameters; thus the multiple-phase is chosen, and the parameters are transmitted at 508. Subsequently, a connection can be established, and at 510, user plane data transfer can begin. Moreover, where the single-phase described above is sufficient, and no multiple-phase is selected at 504, the user plane data transfer can begin at this point as well at 510.

Now referring to FIG. 6, a methodology 600 that facilitates supporting a multiple-phase connection establishment is illustrated. At 602, a connection establishment request can be received. The request can comprise information regarding the requester to obtain communications resources (e.g., radio signaling bearers) for the requester. At 604, the request is initialized with the network; for example, a downstream network device can have a context for the requester or other information associated therewith. At 606, a determination can be made regarding whether additional parameters are desired or required to complete the connection establishment. For example, the downstream network can require additional information related to security re-configuration/authorization, an identity or context of the requester, additional requester related parameters, and/or the like as described previously. At 608, a request for the additional parameters can be transmitted if desired, and then the determination for additional parameters can be made again at 606, and so on. If the information given in the request and/or the additional parameters are sufficient at 606, then the connection establishment request can be completed (successfully or otherwise for example) at 610.

It will be appreciated that, in accordance with one or more aspects described herein, inferences can be made regarding selecting a single- or multiple-phase connection establishment as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting the type of connection establishment (e.g., single- or multiple-phase), additional parameters to send with the connection establishment request, when to send the additional parameters, protocols or NAS messages with which to transmit additional parameters, and/or the like.

Figure 7:
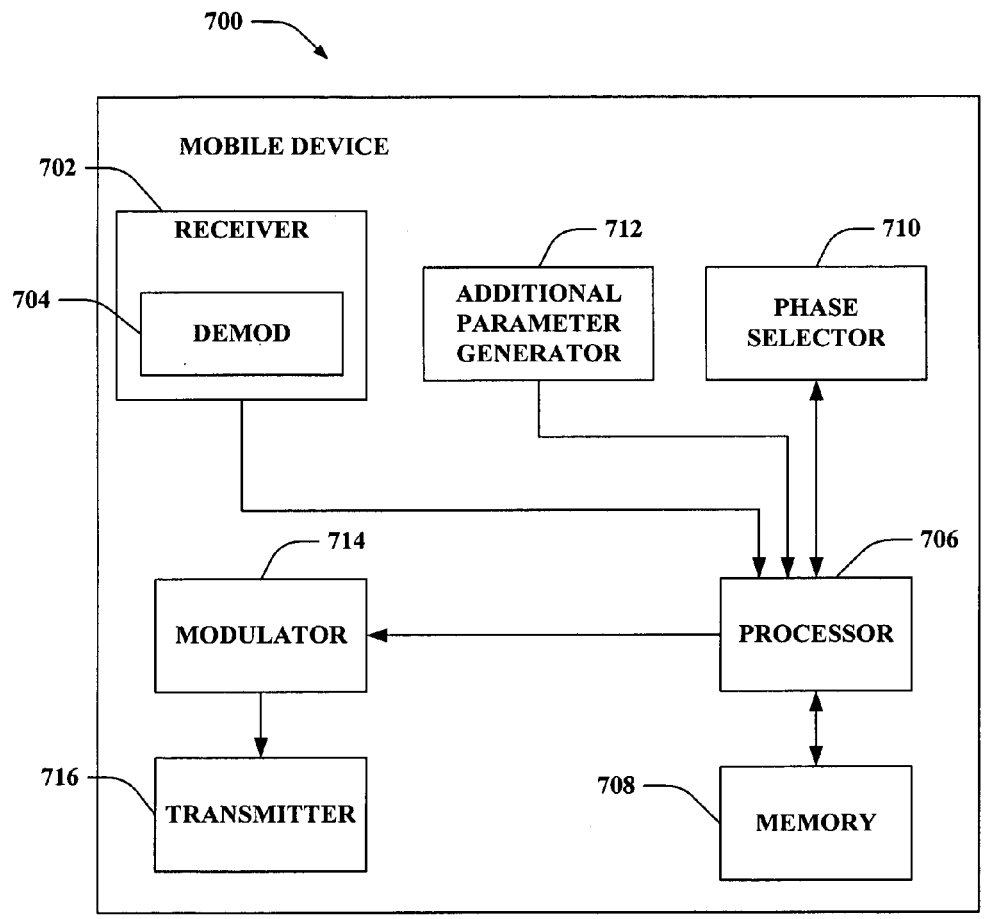
FIG. 7 is an illustration of an example mobile device that facilitates parameter generation for a phase selectable connection establishment.

FIG. 7 is an illustration of a mobile device 700 that facilitates selective phase connection establishment in a wireless communications network. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a phase selector 710 that can choose between a single- or multiple phase connection establishment as described above and an additional parameter generator 712 that can determine additional parameters to send using transmitter 716. In an example, the mobile device 700 can desire to establish connection with one or more base stations to facilitate communicating mobile network data; this can include moving to a new base station, switching from an idle to an active state, etc. The mobile device 700 can transmit an initial connection establishment message to the base station via the transmitter 716. If additional information is required or desired (e.g., by the mobile device 700, base station, other network component, etc.), the phase selector 710 can choose a multiple-phase establishment, and the additional parameter generator 712 can determine the additional parameters and transmit them to the requesting device. This can be a NAS message, in one example, or a signaling command to the base station, etc. as described. The parameters can relate to security configuration, re-authorization, identity, context, and the like as described. Mobile device 700 still further comprises a modulator 714 and transmitter 716 that respectively modulate and transmit signals to, for instance, a base station, another mobile device, etc. Although depicted as being separate from the processor 706, it is to be appreciated that the phase selector 710, additional parameter generator 712, demodulator 704, and/or modulator 714 can be part of the processor 706 or multiple processors (not shown).

Figure 8:
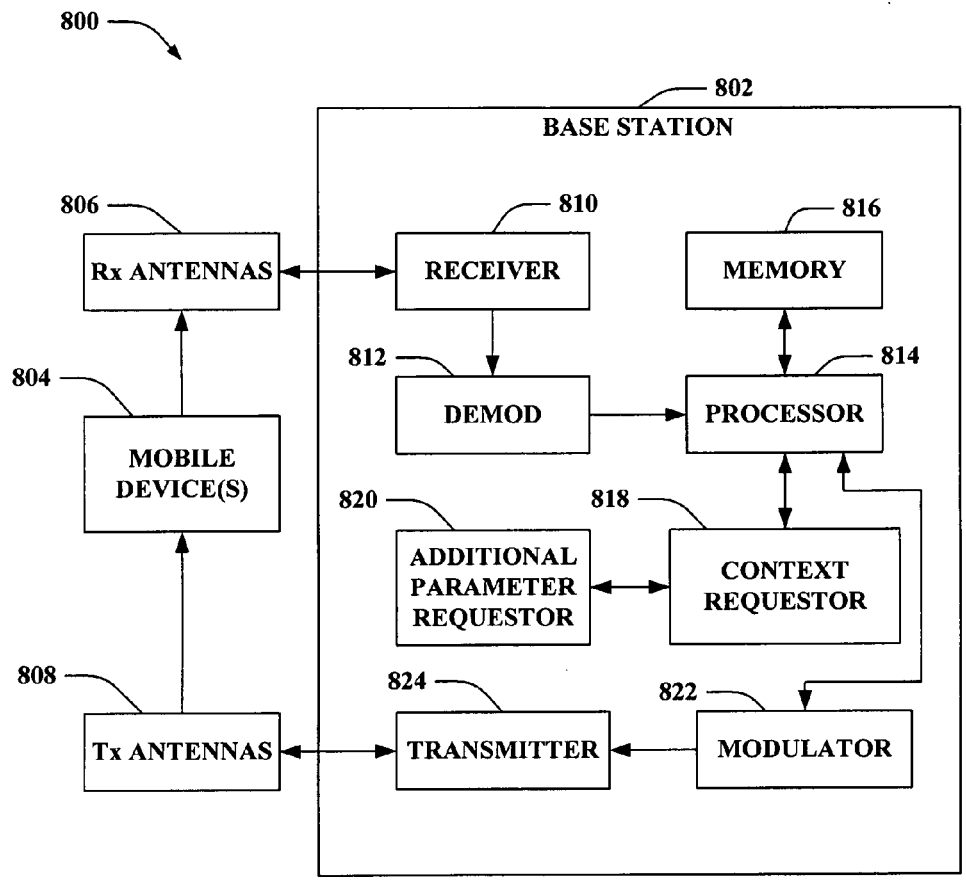
FIG. 8 is an illustration of an example system that facilitates establishing a multiple-phase connection for a device.

FIG. 8 is an illustration of a system 800 that facilitates establishing connection for a device using a multiple-phase establishment. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a context requester 818 that can communicate with a network component (not shown) to get a context for one or more mobile devices 804 and an additional parameter requester 820 that can request additional information from the mobile devices 804 where desired or required by the base station 902 or network component.

In one example, one or more mobile devices 804 can request connection establishment from the base station 802. The context requestor 818 can contact the network component to ensure the device(s) 804 are authorized to access the wireless communications network. In so doing, the network component can require additional information regarding the mobile device(s) 804, such as context information, security authorization or configuration information, identity information, and/or the like, or the network component can transmit a NAS message to the mobile device(s) 804. The additional parameter requester 820 can transmit the request for additional information (and/or the NAS message) to the mobile device(s) 804 to facilitate establishing connection. Furthermore, although depicted as being separate from the processor 814, it is to be appreciated that the context requestor 818, additional parameter requestor 820, demodulator 812, and/or modulator 822 can be part of the processor 814 or multiple processors (not shown).

Figure 9:
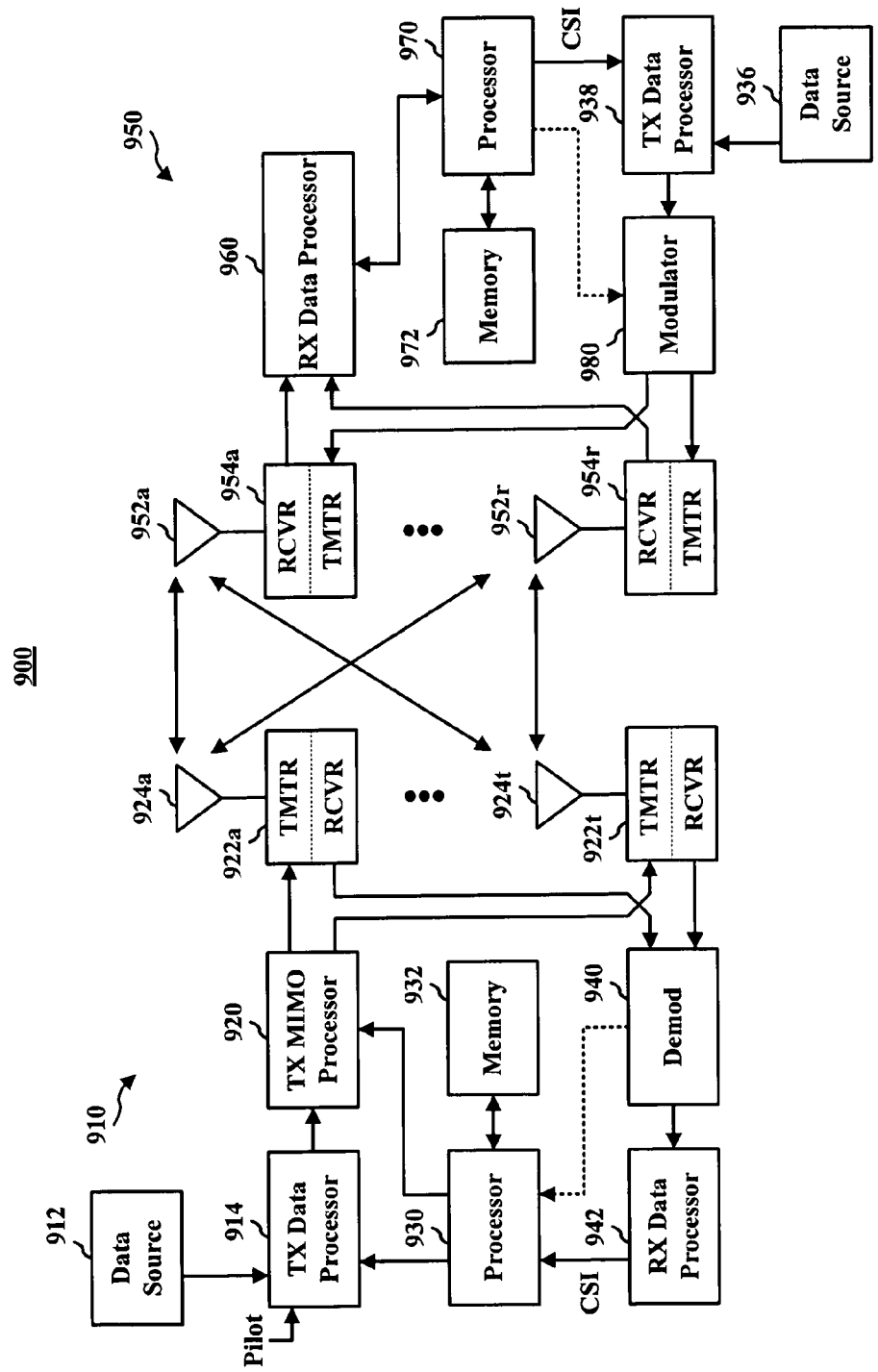
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), configurations (FIG. 4) and/or methods (FIGS. 5-6), and/or portions thereof, described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
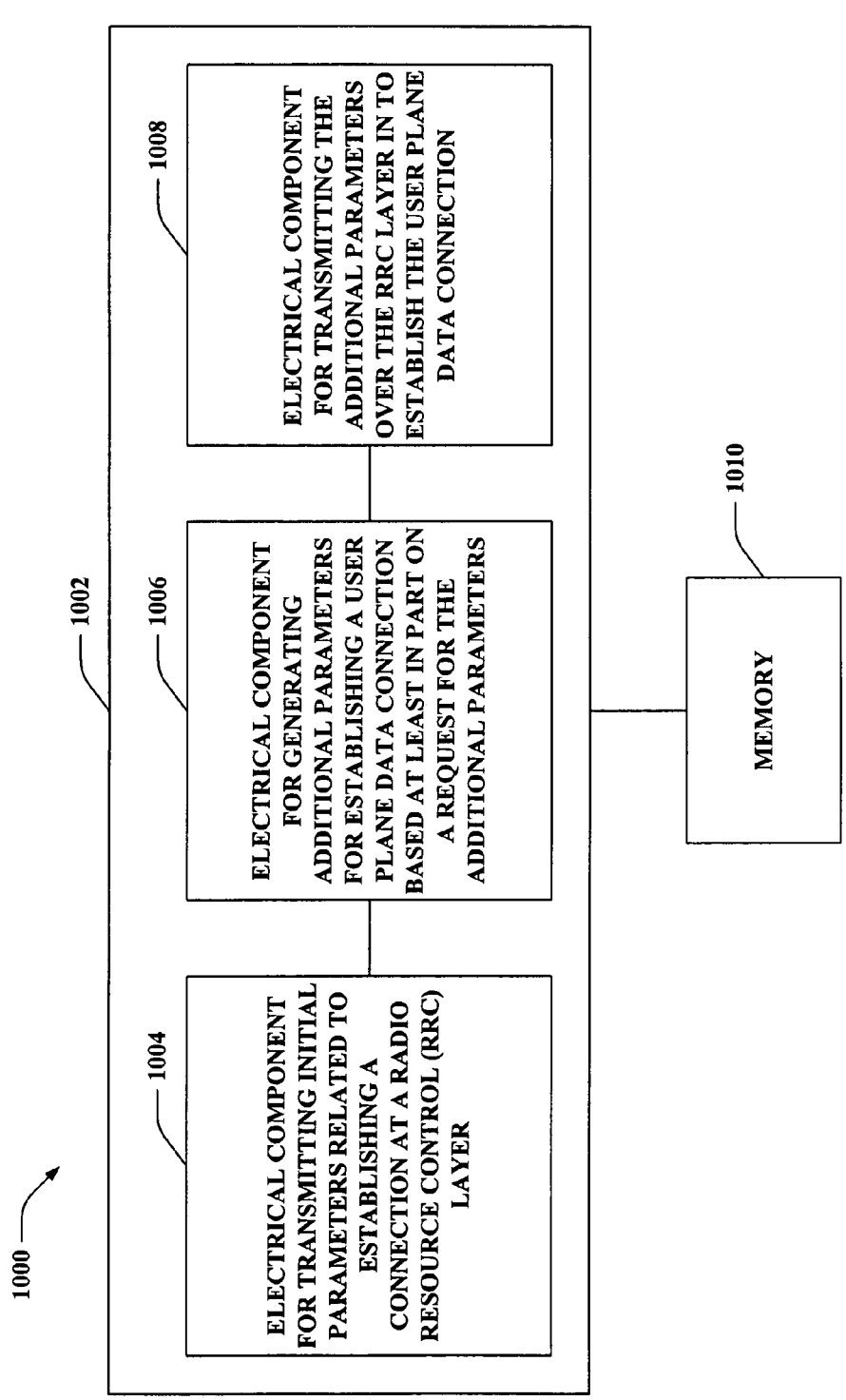
FIG. 10 is an illustration of an example system that establishes a multiple-phase connection with a wireless communications network.

With reference to FIG. 10, illustrated is a system 1000 that facilitates requesting user plane resources in a multiple-step connection establishment. For example, system 1000 can reside at least partially within a base station, mobile device, etc. It is to be appreciated that system 1000 is represented as including functional blocks, which can be functional blocks that represent functions implemented by a processor, software, or combination thereof (e.g. firmware). System 1000 includes a logical grouping 1002 of electrical components that can act in conjunction. For instance, logical grouping 1002 can include an electrical component for transmitting initial parameters related to establishing a connection at an RRC layer 1004. For example, the connection can be established based on a request for the resources of the RRC or other media layer. Further, logical grouping 1002 can comprise an electrical component for generating additional parameters for establishing a user plane data connection based at least in part on a request for the additional parameters 1006. For example, the second connection layer can relate to a network component that comprises a context for the system 1000; the additional information can relate to synchronizing the context, authorization or identity related thereto, etc. In another example, the request for additional parameters can be in the form of a NAS message. Moreover, logical grouping 1002 can comprise an electrical component for transmitting the additional parameters over the RRC layer to establish the user plan data connection 1008. Thus, additional resources can be utilized to complete a request from the network component and establish a user plane connection therewith. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
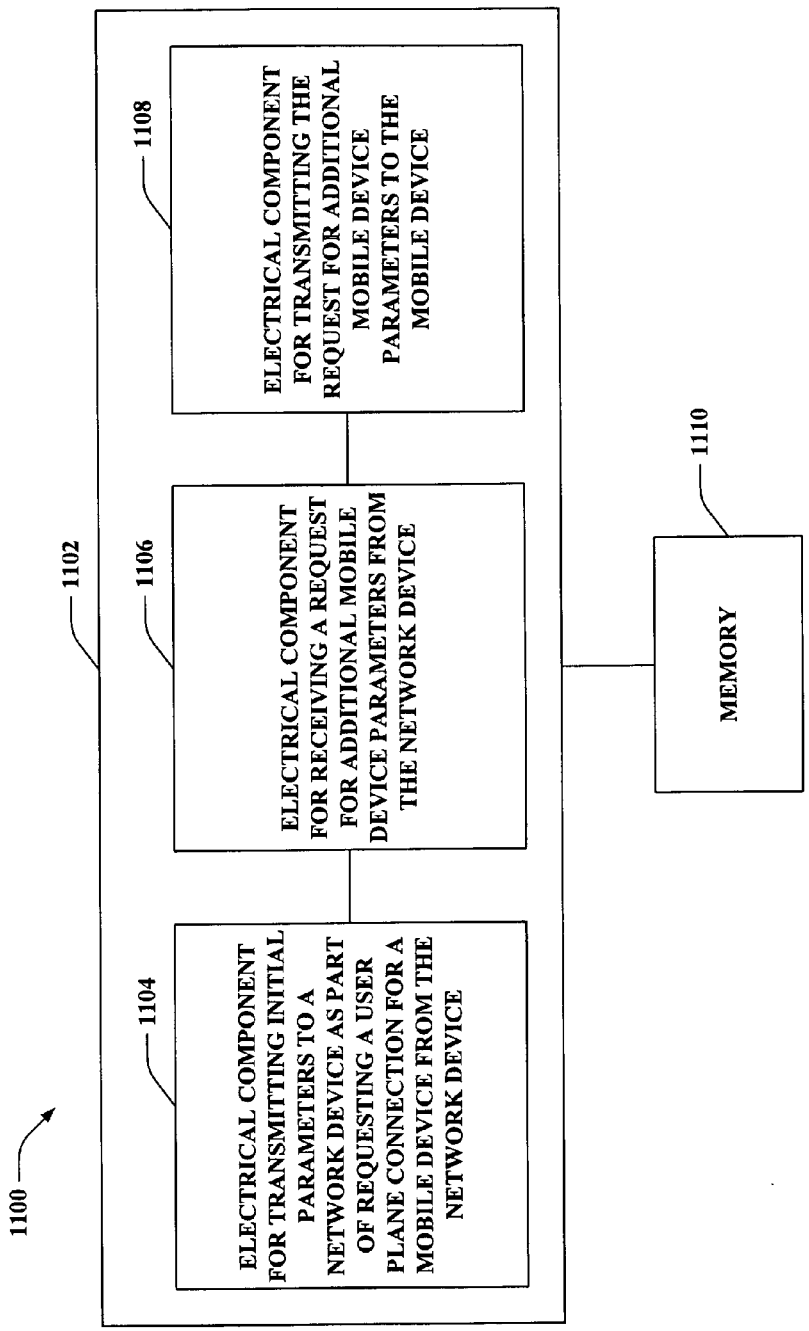
FIG. 11 is an illustration of an example system that communicates with a device to establish a multiple-phase connection for the device.

Turning to FIG. 11, illustrated is a system 1100 that communicates user plane connection establishment data from a mobile device. System 1100 can reside within a base station, mobile device, etc., for instance. As depicted, system 1100 includes functional blocks that can represent functions implemented by a processor, software, or combination thereof (e.g. firmware). System 1100 includes a logical grouping 1102 of electrical components that facilitate establishing the communications. Logical grouping 1102 can include an electrical component for transmitting initial parameters to a network device as part of requesting a user plane connection for a mobile device from the network device 1104. For example, an RRC layer (or other media layer) connection can have been established, but additional parameters can be required and/or desired to establish connection in the user plane. Moreover, logical grouping 1102 can include an electrical component for receiving a request for additional mobile device parameters from the network device 1106. In this regard, the network device can require more information than can be sent in the initial RRC layer request to further authenticate the mobile device in one example. The parameter request can be in the form of a NAS message for example. Further, logical grouping 1102 can comprise an electrical component for transmitting the request for additional mobile device parameters to the mobile device 1108. Subsequently, for example, the parameters can be generated by the mobile device and transmitted to the requesting device; this can be a NAS message as well. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for establishing a connection with an access point in a wireless communications network, comprising:
   transmitting initial parameters related to establishing a connection at a radio resource control (RRC) layer;
   determining whether to select a single-phase or a multiple-phase connection establishment based at least in part on a size limitation of a transmission time interval (TTI) allocated for transmitting the initial parameters;
   upon determining to select a multiple-phase connection establishment, generating additional non-access stratum (NAS) parameters for establishing a user plane data connection; and
   transmitting the additional NAS parameters in an RRC message over the RRC layer to establish the user plane data connection.

2. The method of claim 1, wherein determining to select a multiple-phase connection establishment is based at least in part on a requirement of a downstream network component, and wherein the downstream network component stores a context and the additional NAS parameters corresponds to at least one update related to the context.

3. The method of claim 1, wherein determining to select a multiple-phase connection establishment is based at least in part on a requirement of a downstream network component, and wherein the downstream network component stores authorization information and the additional NAS parameters corresponds to at least one value related to the authorization information.

4. The method of claim 1, wherein the additional NAS parameters are generated and transmitted based at least in part on the size limitation associated with transmitting the initial parameters.

5. The method of claim 1, further comprising receiving a resource grant in response to transmitting the initial parameters.

6. The method of claim 1, further comprising transitioning from an idle to an active state to transmit the initial parameters.

7. The method of claim 1, wherein the initial parameters and the additional NAS parameters are transmitted in the same RRC message over the RRC layer.

8. The method of claim 7, wherein the initial parameters and the additional NAS parameters are transmitted over a plurality of TTIs.

9. A wireless communications apparatus, comprising:
   at least one processor configured to:
      transmit initial parameters related to establishing a connection at a radio resource control (RRC) layer;
      determine whether to select a single-phase or a multiple-phase connection establishment procedure based at least in part on a size limitation of a transmission time interval (TTI) allocated for transmitting the initial parameters;
      upon determining to select a multiple-phase connection establishment, generate additional non-access stratum (NAS) parameters for establishing a user plane data connection; and
      transmit the additional NAS parameters in an RRC message over the RRC layer to establish the user plane data connection; and
   a memory coupled to the at least one processor.

10. The wireless communications apparatus of claim 9, wherein determining to select a multiple-phase connection establishment is based at least in part on a requirement of a downstream network component, and wherein the downstream network component stores a context and the additional NAS parameters corresponds to at least one update related to the context.

11. The wireless communications apparatus of claim 9, wherein determining to select a multiple-phase connection establishment is based at least in part on a requirement of a downstream network component, and wherein the downstream network component stores authorization information and the additional NAS parameters corresponds to at least one value related to the authorization information.

12. The wireless communications apparatus of claim 9, wherein the additional NAS parameters are generated and transmitted based at least in part on the size limitation associated with transmitting the initial parameters.

13. The wireless communications apparatus of claim 9, wherein the at least one processor is further configured to receive a resource grant in response to transmitting the initial parameters.

14. The wireless communications apparatus of claim 9, wherein the at least one processor is further configured to transition from an idle to an active state to transmit the initial parameters.

15. The wireless communications apparatus of claim 9, wherein the initial parameters and the additional NAS parameters are transmitted in the same RRC message over the RRC layer.

16. The wireless communications apparatus of claim 15, wherein the initial parameters and the additional NAS parameters are transmitted over a plurality of TTIs.

17. A wireless communications apparatus that uses a selective multiple-phase connection establishment in a wireless communications network, comprising:
    means for transmitting initial parameters related to establishing a connection at a radio resource control (RRC) layer;
    means for determining whether to select a single-phase or a multiple-phase connection establishment procedure based at least in part on a size limitation of a transmission time interval (TTI) allocated for transmitting the initial parameters;
    upon determining to select a multiple-phase connection establishment, means for generating additional non-access stratum (NAS) parameters for establishing a user plane data connection; and
    means for transmitting the additional NAS parameters in an RRC message over the RRC layer to establish the user plane data connection.

18. The wireless communications apparatus of claim 17, wherein determining to select a multiple-phase connection establishment is based at least in part on a requirement of a downstream network component, and wherein the downstream network component stores a context and the additional NAS parameters corresponds to at least one update related to the context.

19. The wireless communications apparatus of claim 17, wherein determining to select a multiple-phase connection establishment is based at least in part on a requirement of a downstream network component, and wherein the downstream network component stores authorization information and the additional NAS parameters corresponds to at least one value related to the authorization information.

20. The wireless communications apparatus of claim 17, wherein the additional NAS parameters are generated and transmitted based at least in part on the size limitation associated with transmitting the initial parameters.

21. The wireless communications apparatus of claim 17, further comprising means for receiving a resource grant in response to transmitting the initial parameters.

22. The wireless communications apparatus of claim 17, further comprising means for transitioning from an idle to an active state to transmit the initial parameters.

23. The wireless communications apparatus of claim 17, wherein the means for transmitting transmits the initial parameters and the additional NAS parameters in the same RRC message over the RRC layer.

24. The wireless communications apparatus of claim 23, wherein the initial parameters and the additional NAS parameters are transmitted over a plurality of TTIs.

25. A computer program product, comprising:
    a non-transitory computer-readable medium comprising:
        code for causing at least one computer to transmit initial parameters related to establishing a connection at a radio resource control (RRC) layer;
        code for causing the at least one computer to determine whether to select a single-phase or a multiple-phase connection establishment procedure based at least in part on a size limitation of a transmission time interval (TTI) allocated for transmitting the initial parameters;
        upon determining to select a multiple-phase connection establishment, code for causing the at least one computer to generate additional non-access stratum (NAS) parameters for establishing a user plane data connection; and
        code for causing the at least one computer to transmit the additional NAS parameters in an RRC message over the RRC layer to establish the user plane data connection.

26. The computer program product of claim 25, wherein the code for causing the computer to determine to select a multiple-phase connection establishment is based at least in part on a requirement of a downstream network component, and wherein the downstream network component stores a context and the additional NAS parameters correspond to at least one update related to the context.

27. The computer program product of claim 25, wherein the code for causing the computer to determine to select a multiple-phase connection establishment is based at least in part on a requirement of a downstream network component, and wherein the downstream network component stores authorization information and the additional NAS parameters corresponds to at least one value related to the authorization information.

28. The computer program product of claim 25, wherein the additional NAS parameters are generated and transmitted based at least in part on the sized limitation associated with transmitting the initial parameters.

29. The computer program product of claim 25, the computer-readable medium further comprising code for causing the at least one computer to receive a resource grant in response to transmitting the initial parameters.

30. The computer program product of claim 25, the computer-readable medium further comprising code for causing the at least one computer to transition from an idle to an active state to transmit the initial parameters.

31. A method for facilitating user plane connection for mobile devices in a wireless communications network, comprising:
    transmitting initial parameters to a network device as part of requesting a user plane connection for a mobile device from the network device;
    determining whether a single-phase or a multiple-phase connection establishment procedure has been selected, the single-phase or multiple-phase connection establishment being selected based at least in part on a size limitation of a transmission time interval (TTI) allocated for transmitting the initial parameters;
    upon determining that a multiple-phase connection establishment has been selected, receiving additional non-access stratum (NAS) parameters in a radio resource control (RRC) layer connection message over the RRC layer; and granting RRC layer resources to the mobile device based on the RRC layer connection message independent of receiving a response from the network device.

32. The method of claim 31, further comprising assigning radio resource control (RRC) layer resources to the mobile device based on an initial connection establishment request received from the mobile device.

33. The method of claim 31, wherein the network device stores information regarding the mobile device and one or more of the additional NAS parameters relates to updating a portion of the information regarding the mobile device.

34. The method of claim 33, wherein the stored information regarding the mobile device relates to authorization or contextual parameters for the mobile device.

35. The method of claim 31, further comprising establishing the user plane connection for the mobile device based at least in part on forwarding the additional NAS parameters received from the mobile device to the network device.

36. A wireless communications apparatus, comprising:
  at least one processor configured to:
    transmit initial parameters to a network device as part of requesting a user plane connection for a mobile device from the network device;
    determine whether a single-phase or a multiple-phase connection establishment procedure has been selected, the single-phase or multiple-phase connection establishment being selected based at least in part on a size limitation of a transmission time interval (TTI) allocated for transmitting the initial parameters;
    upon determining that a multiple-phase connection establishment has been selected, receive additional non-access stratum (NAS) parameters in a radio resource control (RRC) layer connection message over the RRC layer; and
    grant RRC layer resources to the mobile device based on the RRC layer connection message independent of receiving a response from the network device.

37. The wireless communications apparatus of claim 36, wherein the at least one processor is further configured to assign radio resource control (RRC) layer resources to the mobile device based on an initial connection establishment request received from the mobile device.

38. The wireless communications apparatus of claim 36, wherein the network device stores information regarding the mobile device and one or more of the additional NAS parameters relates to updating a portion of the information regarding the mobile device.

39. The wireless communications apparatus of claim 38, wherein the stored information regarding the mobile device relates to authorization or contextual parameters for the mobile device.

40. The wireless communications apparatus of claim 36, wherein the at least one processor is further configured to establish the user plane connection for the mobile device based at least in part on forwarding the additional NAS parameters received from the mobile device to the network device.

41. A wireless communications apparatus for establishing a multiple-phase user plane connection for a mobile device, comprising:
  means for transmitting initial parameters to a network device as part of requesting a user plane connection for a mobile device from the network device;
  means for determining whether a single-phase or a multiple-phase connection establishment procedure has been selected, the single-phase or multiple-phase connection establishment being selected based at least in part on a size limitation of a transmission time interval (TTI) allocated for transmitting the initial parameters;
  upon determining that a multiple-phase connection establishment has been selected, means for receiving additional non-access stratum (NAS) parameters in a radio resource control (RRC) layer connection message over the RRC layer; and
  means for granting RRC layer resources to the mobile device based on the RRC layer connection message independent of receiving a response from the network device.

42. The wireless communications apparatus of claim 41, further comprising means for assigning radio resource control (RRC) layer resources to the mobile device based on an initial connection establishment request received from the mobile device.

43. The wireless communications apparatus of claim 41, wherein the network device stores information regarding the mobile device and one or more of the additional NAS parameters relates to updating a portion of the information regarding the mobile device.

44. The wireless communications apparatus of claim 43, wherein the stored information regarding the mobile device relates to authorization or contextual parameters for the mobile device.

45. The wireless communications apparatus of claim 41, further comprising means for establishing the user plane connection for the mobile device based at least in part on forwarding the additional NAS parameters received from the mobile device to the network device.

46. A computer program product, comprising:
  a non-transitory computer-readable medium comprising:
    code for causing at least one computer to transmit initial parameters to a network device as part of requesting a user plane connection for a mobile device from the network device;
    code for causing the computer to determine whether a single-phase or a multiple-phase connection establishment procedure has been selected, the single-phase or multiple-phase connection establishment being selected based at least in part on a size limitation of a transmission time interval (TTI) allocated for transmitting the initial parameters;
    upon determining that a multiple-phase connection establishment has been selected, code for causing the at least one computer to receive additional non-access stratum (NAS) parameters in a radio resource control (RRC) layer connection message over the RRC layer; and
    code for causing the at least one computer to grant RRC layer resources to the mobile device based on the RRC layer connection message independent of receiving a response from the network device.

47. The computer program product of claim 46, the computer-readable medium further comprising code for causing the at least one computer to assign radio resource control (RRC) layer resources to the mobile device based on an initial connection establishment request received from the mobile device.

48. The computer program product of claim 46, wherein the network device stores information regarding the mobile device and one or more of the additional NAS parameters relates to updating a portion of the information regarding the mobile device.

49. The computer program product of claim 48, wherein the stored information regarding the mobile device relates to authorization or contextual parameters for the mobile device.

50. The computer program product of claim 48, the computer-readable medium further comprising code for causing the at least one computer to establish the user plane connection for the mobile device based at least in part on forwarding the additional NAS parameters received from the mobile device to the network device.

* * * * *